(12) United States Patent
Tsai

(10) Patent No.: US 11,891,540 B2
(45) Date of Patent: Feb. 6, 2024

(54) MULTILAYER TREADMILL WALKING BOARD ASSEMBLY THAT ELIMINATES STATIC ELECTRICITY AND ACHIEVES WEARPROOF AND LUBRICATING PURPOSES AND METHOD FOR MAKING IT

(71) Applicant: Yu-Lun Tsai, Taichung (TW)

(72) Inventor: Yu-Lun Tsai, Taichung (TW)

( * ) Notice: Subject to any disclaimer, the term of this patent is extended or adjusted under 35 U.S.C. 154(b) by 146 days.

(21) Appl. No.: 17/511,894

(22) Filed: Oct. 27, 2021

(65) Prior Publication Data

US 2022/0049107 A1 Feb. 17, 2022

Related U.S. Application Data

(63) Continuation-in-part of application No. 16/745,634, filed on Jan. 17, 2020, now abandoned.

(51) Int. Cl.
*C09D 5/24* (2006.01)
*C09D 7/61* (2018.01)

(52) U.S. Cl.
CPC ................. *C09D 5/24* (2013.01); *C09D 7/61* (2018.01)

(58) Field of Classification Search
CPC ..... C09D 5/24; C09D 7/61; C09D 7/65; B32B 27/00; E04F 2290/048; A63B 22/02; A63B 2244/00
See application file for complete search history.

(56) References Cited

FOREIGN PATENT DOCUMENTS

| CN | 1456374 | * 11/2003 |
| CN | 205569605 | * 9/2016 |

* cited by examiner

*Primary Examiner* — Tabassom Tadayyon Eslami
(74) *Attorney, Agent, or Firm* — Best & Flanagan LLP

(57) ABSTRACT

A method for manufacturing a multilayer treadmill walking board assembly includes preparing a plurality of components, mixing and stirring the components to form a composite material, heating the composite material to a temperature of 140-160° C., cooling the composite material to a temperature of 80-85° C. so that the composite material is disposed at a thick state, applying the composite material on a top face of a support board, to form a coating on the support board, solidifying the coating during a time interval of 2-5 minutes, rapidly cooling the coating to a temperature of 20-30° C., with the composite material producing a stepwise multilayer deposit, thereby serially forming the wear-resistant layer, the lubricating layer, and the antistatic layer from bottom to top, and solidifying the coating to form a product.

6 Claims, 2 Drawing Sheets

MULTILAYER TREADMILL WALKING BOARD ASSEMBLY THAT ELIMINATES STATIC ELECTRICITY AND ACHIEVES WEARPROOF AND LUBRICATING PURPOSES AND METHOD FOR MAKING IT

CROSS-REFERENCES TO RELATED APPLICATIONS

The present invention is a continuation-in-part (C.I.P.) application of the U.S. Ser. No. 16/745,634 now abandoned, filed on Jan. 17, 2020.

BACKGROUND OF THE INVENTION

1. Field of the Invention

The present invention relates to a treadmill and, more particularly, to a walking board assembly for a treadmill and a method for making the walking board assembly.

2. Description of the Related Art

A conventional treadmill comprises a walking board, a walking belt, and a plurality of rollers. The walking belt rotates on the walking board along a closed trajectory, to facilitate the user stepping on the walking board successively. The walking belt, the rollers and the walking board rub mutually for a long time, to accumulate static electricity, and to discharge the static electricity to the user, thereby scaring the user and causing an uncomfortable sensation to the user, and easily interfering with the electronic components of the treadmill. An antistatic yarn is added to the inner side of the walking belt to eliminate the static electricity. However, the antistatic yarn is easily worn out when the walking belt and the walking board rub constantly during a long-term utilization, and loses its antistatic effect gradually. The walking belt, the rollers, and the walking board rub frequently, such that the walking belt and the walking board are easily worn out during a long-term utilization, thereby decreasing the lifetime of the walking belt and the walking board. A slip assistant strip is adhered to the inner side of the walking belt to reduce the friction between the walking belt and the walking board. Alternatively, a melamine layer is stuck on the top surface of the walking board to reduce the friction between the walking belt and the walking board. However, the friction produces a high temperature. Moreover, a wear-resistant and high-temperature resistant surface layer is stuck to the walking board, and a lubricant or wax is sprayed on the surface layer, to reduce the friction between the walking belt and the walking board, such that the walking belt is moving on the walking board smoothly, thereby preventing from producing resistance and high temperature due to frequent friction during a long-term utilization. However, the user has to replenish the lubricant or wax during a period of time, thereby greatly causing inconvenience to the user, and thereby increasing the cost.

BRIEF SUMMARY OF THE INVENTION

The primary objective of the present invention is to provide a multilayer treadmill walking board assembly that eliminates static electricity and achieves wearproof and lubricating purposes.

In accordance with the present invention, there is provided a method for manufacturing a multilayer treadmill walking board assembly, comprising a first step of preparing a plurality of components having a weight proportion including: a resin of 100 g, a catalyst of 0.2-0.8 g, a hardener of 0.5-2.5 g, a mineral powder of 20.0-45.0 g, a lubricating oil of 5.0-10.0 g, and a graphite mixture of 15.0-40.0 g, a second step of mixing and stirring the components to form a composite material, a third step of heating the composite material to a first temperature of 140-160° C., a fourth step of cooling the composite material to a second temperature of 80-85° C. so that the composite material is disposed at a thick state, a fifth step of applying the composite material on a top face of a support board, to form a coating on the support board, a sixth step of solidifying the coating during a time interval of 2-5 minutes, a seventh step of rapidly cooling the coating to a third temperature of 20-30° C., with the composite material of the coating producing a stepwise multilayer deposit gradually by relatively different specific gravity and different types of the components during a cooling solidification process, thereby serially forming the wear-resistant layer, the lubricating layer, and the antistatic layer from bottom to top, and an eighth step of solidifying the coating to form a product which includes the wear-resistant layer, the lubricating layer located above the wear-resistant layer, and the antistatic layer located above the lubricating layer.

According to the primary advantage of the present invention, the antistatic layer of the coating contains the graphite mixture and the antistatic agent, and is added with a macromolecule compound with a high conducting feature, such that the upper face of the multilayer treadmill walking board assembly has a better lubricating effect, to assist a sliding movement of the walking belt, and to reduce the friction between the walking belt and the support board, thereby preventing from incurring a wear therebetween, and thereby enhancing the lifetime of the walking belt and the support board.

According to another advantage of the present invention, the coating eliminates the static electricity such that the friction between the walking belt and the support board will not accumulate the static electricity.

According to a further advantage of the present invention, the coating with a predetermined thickness is integrally applied on the support board by a spreading machine or an applicator, and is cured and secured to the support board rapidly, such that the coating and the support board are combined closely and tightly by the adhesive feature of the resin, and will not be detached from each other.

According to a further advantage of the present invention, the antistatic coefficient of the antistatic layer, the lubricating coefficient of the lubricating layer, and the friction coefficient of the wear-resistant layer are not reduced or eliminated during a long-term utilization.

According to a further advantage of the present invention, the component proportion of the composite material of the coating is adjusted according a customized requirement, so as to change the antistatic degree of the antistatic layer, the lubricating degree of the lubricating layer, and the wear-resistant degree of the wear-resistant layer.

According to a further advantage of the present invention, the thickness of the coating is adjusted according a customized requirement.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
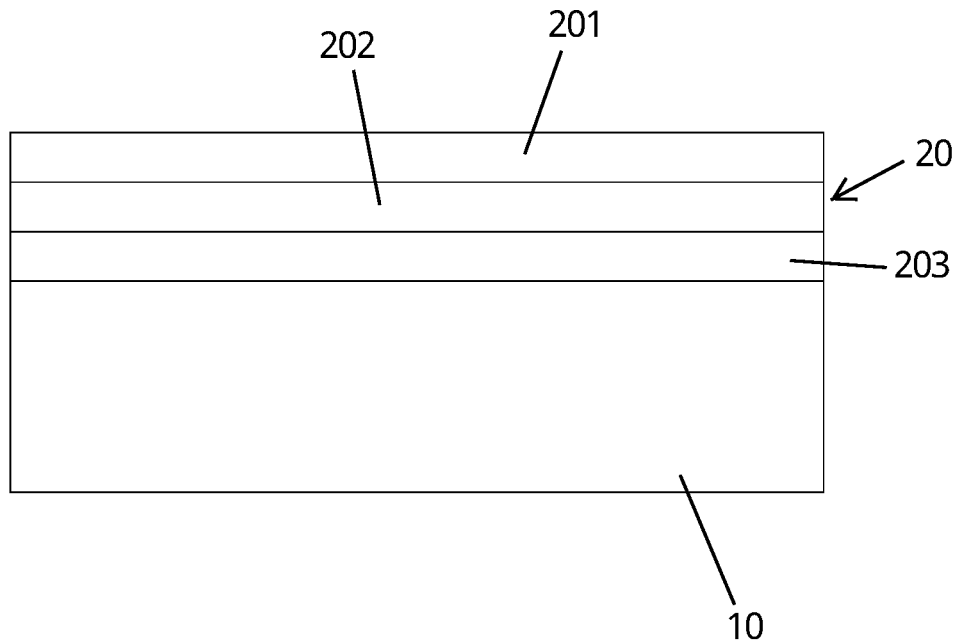
FIG. 1 is a side cross-sectional view of a multilayer treadmill walking board assembly in accordance with the preferred embodiment of the present invention.

Referring to FIG. 1, a multilayer treadmill walking board assembly in accordance with the preferred embodiment of the present invention comprises a support board 10, and a coating 20 secured on the support board 10. The coating 20 includes a wear-resistant layer 203, a lubricating layer 202, and an antistatic layer 201. The wear-resistant layer 203 is bonded onto a top face of the support board 10 and located between the support board 10 and the lubricating layer 202. The lubricating layer 202 is bonded onto a top face of the wear-resistant layer 203 and located between the wear-resistant layer 203 and the antistatic layer 201. The antistatic layer 201 is bonded onto a top face of the lubricating layer 202. Thus, the wear-resistant layer 203, the lubricating layer 202, and the antistatic layer 201 are serially formed and arranged on the support board 10 from bottom to top.

The coating 20 is applied and cured on the support board 10 at one time. The coating 20 is made of a composite material. The composite material is heated by a thermal reaction under a high temperature, and is then applied on the support board 10. The composite material is then cooled and solidified to form the coating 20. The composite material includes a plurality of components having different weight proportions and specific gravity. The composite material of the coating 20 produces a stepwise (or gradient) multilayer deposit (or sediment) gradually by the gravity and the material state of the components of the composite material during a cooling solidification process, and in turn forms the wear-resistant layer 203, the lubricating layer 202 located above the wear-resistant layer 203, and the antistatic layer 201 located above the lubricating layer 202. Thus, the multilayer treadmill walking board assembly has an antistatic function by provision of the antistatic layer 201, has a lubricating function by provision of the lubricating layer 202, and has a wear-resistant function by provision of the wear-resistant layer 203.

In practice, when the user is stepping or running on the multilayer treadmill walking board assembly, no static electricity will remain on the support board 10. In addition, when the walking belt rubs the multilayer treadmill walking board assembly constantly, the multilayer treadmill walking board assembly eliminates the static electricity by provision of the antistatic layer 201 and achieves wear-resistant and lubricating purposes by provision of the wear-resistant layer 203 and the lubricating layer 202, thereby enhancing the lifetime of the treadmill and the parts thereof.

In the preferred embodiment of the present invention, the support board 10 is made of wooden material.

In another preferred embodiment of the present invention, the support board 10 is made of plastic material.

In the preferred embodiment of the present invention, the components of the composite material of the coating 20 have a weight (or mass) proportion including: a resin of 100 g, a catalyst of 0.2-0.8 g, a hardener of 0.5-2.5 g, a mineral powder of 20.0-45.0 g, a lubricating oil of 5.0-10.0 g, and a graphite mixture of 15.0-40.0 g.

In the preferred embodiment of the present invention, the catalyst includes Co-OCT (the mass proportion of Co is 6%). The hardener includes MEKPO (the mass proportion of PO is 55%). The graphite mixture is made of an antistatic material, and is added with a macromolecule (or polymer) compound with a high conducting feature. The graphite mixture includes scaly (or scale-shaped or squamous) graphite powder (30%-45%) and natural microcrystal (or microlite or crystallite) conducting graphite powder (55%-70%).

In the preferred embodiment of the present invention, the components of the composite material of the coating 20 have a specific gravity including: the resin of 0.85-1.1, the mineral powder of 4.0-6.5, the lubricating oil of 0.7-0.75, and the graphite mixture of 1.35-3.0.

In the preferred embodiment of the present invention, the components of the composite material of the coating 20 further include an antistatic agent. Thus, the components of the composite material of the coating 20 primarily include the resin, the catalyst, the hardener, the mineral powder, the lubricating oil, the graphite mixture, and the antistatic agent.

In the preferred embodiment of the present invention, the coating 20 has a multilayer specific gravity of 1.15-3.85 from top to bottom.

Figure 2:
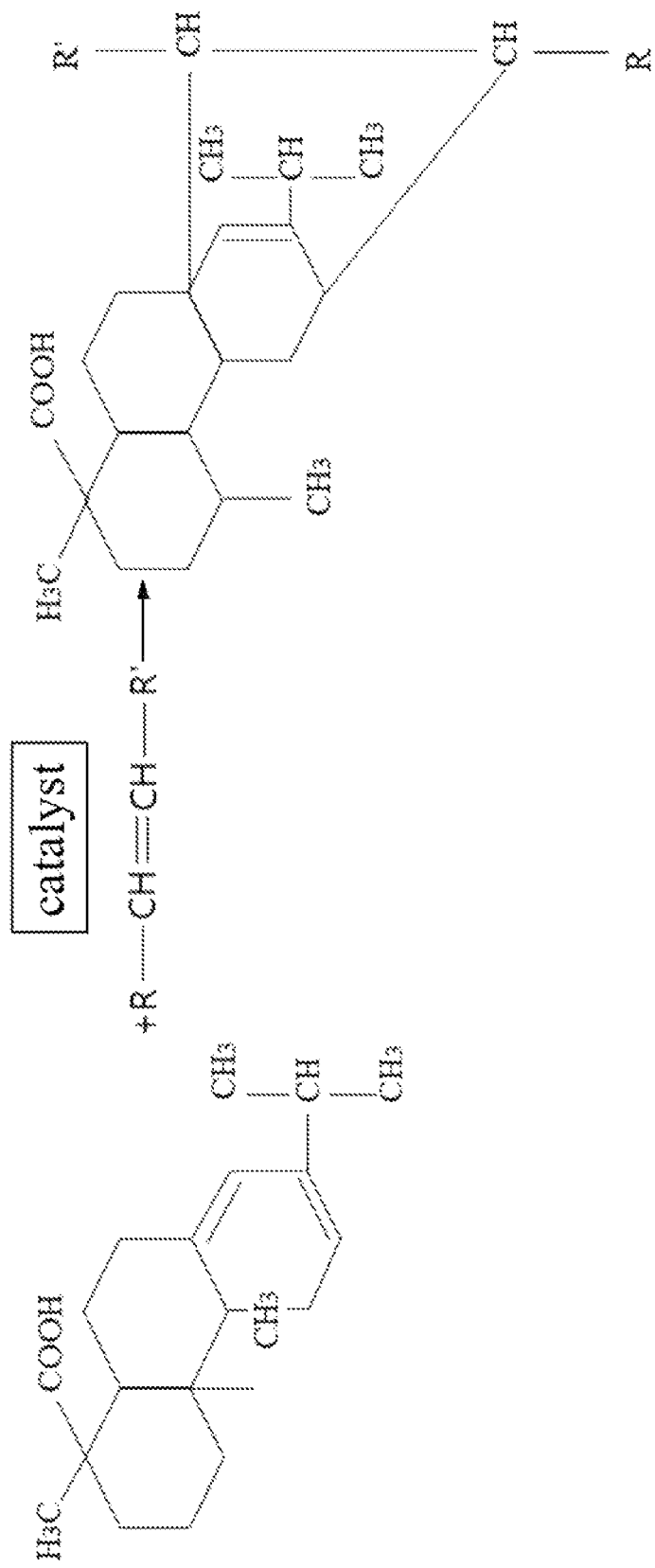
FIG. 2 shows a chemical formula of a coating of the multilayer treadmill walking board assembly during an exothermic reaction at a high temperature.

Referring to FIGS. 1 and 2, a method for manufacturing the multilayer treadmill walking board assembly in accordance with the preferred embodiment of the present invention comprises a first step of preparing a plurality of components having a weight (or mass) proportion including: a resin of 100 g, a catalyst of 0.2-0.8 g, a hardener of 0.5-2.5 g, a mineral powder of 20.0-45.0 g, a lubricating oil of 5.0-10.0 g, and a graphite mixture of 15.0-40.0 g, a second step of mixing and stirring the components to form a composite material, a third step of heating the composite material to a first temperature of 140-160° C., a fourth step of cooling the composite material to a second temperature of 80-85° C. so that the composite material is disposed at a thick state, a fifth step of applying (or spreading or coating or painting) the composite material on a top face of a support board 10, to form a coating 20 on the support board 10, a sixth step of solidifying (or curing) the coating 20 during a time interval of 2-5 minutes, a seventh step of rapidly cooling the coating 20 to a third temperature of 20-30° C., with the composite material of the coating 20 producing a stepwise multilayer deposit gradually by relatively different specific gravity and different types of the components during a cooling solidification process, such that one component having a larger specific gravity is deposited at a lower position of the coating 20, and another component having a smaller specific gravity is deposited at an upper position of the coating 20, thereby serially forming the wear-resistant layer 203, the lubricating layer 202, and the antistatic layer 201 from bottom to top, and an eighth step of solidifying the coating 20 to form a product which includes the wear-resistant layer 203, the lubricating layer 202 located above the wear-resistant layer 203, and the antistatic layer 201 located above the lubricating layer 202.

Thus, the coating 20 has an antistatic function by provision of the antistatic layer 201, has a lubricating function by provision of the lubricating layer 202, and has a wear-resistant function by provision of the wear-resistant layer 203.

In the first step, the catalyst includes Co-OCT (the mass proportion of Co is 6%), and the hardener includes MEKPO (the mass proportion of PO is 55%). In the first step, the graphite mixture includes scaly (or scale-shaped or squamous) graphite powder (30%-45%) and natural microcrystal (or microlite or crystallite) conducting graphite powder (55%-70%). For example, when the scaly graphite powder is 30%, the natural microcrystal conducting graphite powder is 70%, and when the scaly graphite powder is 45%, the natural microcrystal conducting graphite powder is 55%. In the first step, the graphite mixture is made of an antistatic material, and is added with a macromolecule (or polymer) compound with a high conducting feature. In the first step, the components have a specific gravity including: the resin of 0.85-1.1, the mineral powder of 4.0-6.5, the lubricating oil of 0.7-0.75, and the graphite mixture of 1.35-3.0. The first step further includes providing an antistatic agent in the components so that the components include the resin, the catalyst, the hardener, the mineral powder, the lubricating oil, the graphite mixture, and the antistatic agent to provide a better antistatic effect.

In the fifth step, the composite material is applied on the top face of the support board 10 at one time during an exothermic reaction (or heat liberation) at a high temperature, to form the coating 20 on the support board 10. In the fifth step, the support board 10 is made of wooden material.

In the seventh step, the coating 20 has a multilayer specific gravity of 1.15-3.85 from top to bottom. In the seventh step, the graphite mixture has a smaller specific gravity, such that the content of the graphite mixture is decreased gradually from top to bottom. In the seventh step, the viscosity of the composite material of the coating 20 is decreased in three minutes.

FIG. 2 shows the chemical formula of the composite material of the coating 20 during an exothermic reaction at a high temperature. The chemical formula in FIG. 2 explains the chemical process of the exothermic reaction from the first temperature of 140-160° C. to the third temperature of 20-30° C. The components of the coating 20 have a weight (or mass) proportion including: a resin of 100 g, a catalyst of 0.2-0.8 g, a hardener of 0.5-2.5 g, a mineral powder of 20.0-45.0 g, a lubricating oil of 5.0-10.0 g, and a graphite mixture of 15.0-40.0 g Accordingly, the antistatic layer 201 of the coating 20 contains the graphite mixture and the antistatic agent, and is added with a macromolecule compound with a high conducting feature, such that the upper face of the multilayer treadmill walking board assembly has a better lubricating effect, to assist a sliding movement of the walking belt, and to reduce the friction between the walking belt and the support board 10, thereby preventing from incurring a wear therebetween, and thereby enhancing the lifetime of the walking belt and the support board 10. In addition, the coating 20 eliminates the static electricity such that the friction between the walking belt and the support board 10 will not accumulate the static electricity. Further, the coating 20 with a predetermined thickness is integrally applied on the support board 10 by a spreading machine or an applicator, and is cured and secured to the support board 10 rapidly, such that the coating 20 and the support board 10 are combined closely and tightly by the adhesive feature of the resin, and will not be detached from each other. Further, the antistatic coefficient of the antistatic layer 201, the lubricating coefficient of the lubricating layer 202, and the friction coefficient of the wear-resistant layer 203 are not reduced or eliminated during a long-term utilization. Further, the component proportion of the composite material of the coating 20 is adjusted according a customized requirement, so as to change the antistatic degree of the antistatic layer 201, the lubricating degree of the lubricating layer 202, and the wear-resistant degree of the wear-resistant layer 203. Further, the thickness of the coating 20 is adjusted according a customized requirement.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A method for manufacturing a multilayer treadmill walking board assembly, comprising:
    a first step of preparing a plurality of components having a weight proportion including: a resin of 100 g, a catalyst of 0.2-0.8 g, a hardener of 0.5-2.5 g, a mineral powder of 20.0-45.0 g, a lubricating oil of 5.0-10.0 g, and a graphite mixture of 15.0-40.0 g;
    a second step of mixing and stirring the components to form a composite material;
    a third step of heating the composite material to a first temperature of 140-160° C.;
    a fourth step of cooling the composite material to a second temperature of 80-85° C. so that the composite material is disposed at a thick state;
    a fifth step of applying the composite material on a top face of a support board, to form a coating on the support board;
    a sixth step of solidifying the coating during a time interval of 2-5 minutes;
    a seventh step of rapidly cooling the coating to a third temperature of 20-30° C., with the composite material of the coating producing a stepwise multilayer deposit gradually by relatively different specific gravity and different types of the components during a cooling solidification process, thereby serially forming a wear-resistant layer, a lubricating layer, and an antistatic layer from bottom to top; and
    an eighth step of solidifying the coating to form a product which includes the wear-resistant layer, the lubricating layer located above the wear-resistant layer, and the antistatic layer located above the lubricating layer.

2. The method as claimed in claim 1, wherein in the fifth step, the support board is made of wooden material.

3. The method as claimed in claim 1, wherein in the first step, the components have a specific gravity including: the resin of 0.85-1.1, the mineral powder of 4.0-6.5, the lubricating oil of 0.7-0.75, and the graphite mixture of 1.35-3.0.

4. The method as claimed in claim 1, wherein in the seventh step, the coating has a multilayer specific gravity of 1.15-3.85 from top to bottom.

5. The method as claimed in claim 1, wherein in the first step, the graphite mixture includes scaly graphite powder (30%-45%) and natural microcrystal conducting graphite powder (55%-70%).

6. The method as claimed in claim 1, wherein in the fifth step, the composite material is applied on the top face of the support board at one time during an exothermic reaction at a high temperature, to form the coating on the support board.

\* \* \* \* \*